UNITED STATES PATENT OFFICE.

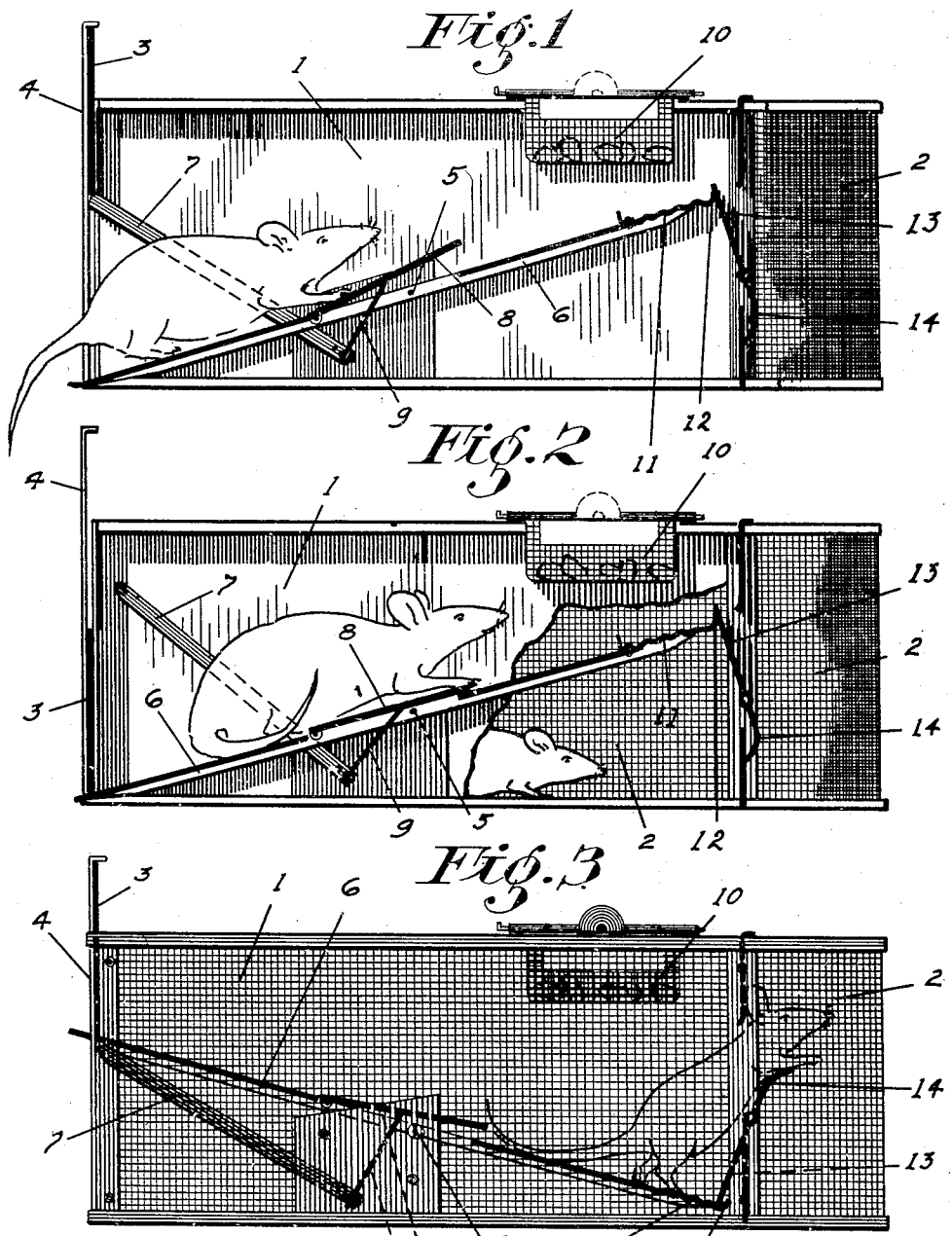

WILLIAM D. BLUDWORTH, OF SACRAMENTO, CALIFORNIA.

RODENT-TRAP.

1,246,857.      Specification of Letters Patent.      Patented Nov. 20, 1917.

Application filed January 11, 1917. Serial No. 141,789.

*To all whom it may concern:*

Be it known that I, WILLIAM D. BLUDWORTH, a citizen of the United States, residing at Sacramento, in the county of Sacramento, State of California, have invented certain new and useful Improvements in Rodent-Traps; and I do declare the following to be a full, clear, and exact description of the same, reference being had to the accompanying drawings, and to the characters of reference marked thereon, which form a part of this application.

This invention relates to improvements in rodent traps, the present application relating to certain improved structure designed to perfect the form of trap shown in my Patent Number 1178125. This application illustrates and claims certain simplified means for the operating of the front door of the trap and likewise a more efficient and positive rear door.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Figure 1. is a side elevation of the trap with the screen removed and showing the doors of the trap in the position which they assume when the trap is set.

Fig. 2 is a similar view showing how the trap is sprung by the entrance of the rodent therein to close the front door. This view is also partly taken out to show the caging compartment which is formed around the rear end and sides of the trap.

Fig. 3 is a side elevation of the trap showing the position the parts assume when the rodent tilts the runway and opens the front and rear doors.

Referring now more particularly to the characters of reference on the drawings the numeral 1 designates the trapping compartment and the numeral 2 designates the caging compartment which is formed at the rear end and around the sides of the trap. This compartment may be made of any suitable material but is preferably made of rigid supporting framework covered with screen.

The numeral 3 designates the front door of the trapping compartment which is slidable in any suitable form of guide mechanism 4. Pivotally mounted as at 5 within the trapping compartment 1 is an operating runway 6. This runway 6 is so pivoted that it is overbalanced on the side toward the door 3 which causes it to normally maintain itself in a position inclined from the bottom of the door opening upward into the trapping compartment.

Pivotally mounted within the trapping compartment 1 are a pair of projecting detents 7 which normally fit underneath the door 3 when it is in its opened position. These detents hold said door open until they are released therefrom in the manner to be hereinafter set forth. Hinged on the runway 6 is the trip trigger 8 connected by a rod 9 with the detents 7. This rod 9 extends through a properly arranged opening in the runway 6.

The numeral 10 designates the bait basket located within the trapping compartment near the inner end thereof and toward which the inclined runway 6 extends.

The rodent, attracted by the bait in the basket 10, enters the trapping compartment through the front door opening. Ascending the inclined runway 6 he steps upon the trip trigger 8. This acts through the medium of the rod 9 to release the detents 7 from engagement with the door 3 and thereupon the door 3 drops to a closed position as shown in Fig. 2. This shuts off the escape of the rodent through the front door so it then advances on the runway 6. The weight of the rodent then tilts the runway to the position shown in Fig. 3 which action lifts the front door 3 to a point at which the detents 7 can trap underneath the same. The runway being inclined now directly opposite its normal position this shuts off possibility of escape through the front door. This position of the runway 6 is maintained as long as the rodent is in the trapping compartment by means of the following construction namely: On the inner end of the runway 6 is a corrugated plate 11 having a curved end 12. When the runway 6 is in its normal position and inclined upwardly from the front end of the trapping compartment to the rear end thereof this curved end engages and holds closed the pivoted rear door 13. When, however, the runway 6 is tilted by the action of the rodent in the manner noted this member 12 moves out of engagement with the door 13 and allows it to drop to open position. When in this position the said door 13 engages one of the corrugations of the plate 11 and hence holds the runway 6 in the position shown in Fig. 3 as long as the rodent is within the trapping compartment. The rear door being opened however, in the manner specified, this leaves a free exit for the rodent from the trapping compartment 1 into the caging compartment 2. The rodent seeing this opening immediately jumps through the same. As he passes through this opening he comes in contact with a curved plate 14 which is connected with the door 13. The weight of the rodent's body against this plate 14 acts to move the door 13 on its pivotal connections and releases it from engagement with the corrugated plate 11. The weight of the rodent being thus taken off of the runway 6 and such runway being released from engagement with the door 13, the runway 6 immediately drops to its normal position. This action closes the door 13 and likewise moves the runway 6 to open communication through the front door of the trapping compartment whereupon the device is ready for a repetition of the operation above described.

From the foregoing description it can be readily seen that I have produced a rodent trap which is automatic in its action and which can catch a number of rodents in rapid succession. It can be constructed for rodents of all sizes and its capacity is only limited by the size of the caging compartment 2.

From the foregoing description it will be readily seen that I have produced such a device as substantially fulfils the object of the invention as set forth herein.

While this specification sets forth in detail the present and preferred construction of the device, still in practice such deviations from such detail may be resorted to as do not form a departure from the spirit of the invention as defined by the appended claims.

Having thus described my invention what I claim as new and useful and desire to secure by Letters Patent is:

1. The combination with a rodent trap having a front door and a pivoted runway which, when tilted from normal position, bars escape through the front door, of a pivoted rear door normally held closed by said runway but arranged to drop and engage the runway when the same is tilted to hold it in that position, and means whereby the rear door may be disengaged from engagement with said runway to allow the runway to gravitate to its original position.

2. The combination with a rodent trap having a front door and a pivoted runway which when tilted from normal position bars escape through the front door, of a pivoted rear door normally held closed by said runway and arranged to drop open when the runway is tilted, a corrugated inner end on the runway engageable by the rear door when it drops open, and a plate on said door engageable by the rodent in passing through the door opening to release the door from the plate, and allow the runway to engage said door and close it.

In testimony whereof I affix my signature.

WILLIAM D. BLUDWORTH.

Copies of this patent may be obtained for five cents each, by addressing the "Commissioner of Patents, Washington, D. C."